W. E. FITZ SIMONS.
METER.
APPLICATION FILED APR. 4, 1916.

1,354,816.

Patented Oct. 5, 1920.

Witnesses:

Inventor
William E. Fitz Simons
By his Attorneys
Gifford & Bull

UNITED STATES PATENT OFFICE.

WILLIAM E. FITZ SIMONS, OF FREEPORT, NEW YORK.

METER.

1,354,816.  Specification of Letters Patent.  Patented Oct. 5, 1920.

Application filed April 4, 1916. Serial No. 88,761.

*To all whom it may concern:*

Be it known that I, WILLIAM E. FITZ SIMONS, a citizen of the United States, residing at Freeport, in the county of Nassau and State of New York, have invented certain new and useful Improvements in Meters, of which the following is a specification.

My invention relates to new and useful improvements in meters, and more particularly to water meters, in which a dial glass or transparent plate covers a dial, or other indicating means, through which dial glass the indications on the dial or other indicating means are visible. It is well known that in devices of this kind, and particularly water meters, the under face of the dial glass becomes clouded or soiled because of formation of water of condensation thereon, or from other deposits so as to obscure a clear view of the dial or indicating means, thereby making it difficult, and sometimes impossible, to make an accurate reading.

My invention contemplates the provision of a cleaning mechanism, preferably in the form of a wiper, operable from a moving part or parts of the meter, and preferably continuously operated, in order that the dial glass will be effectively cleaned and maintained clear, so that at any time the dial or indicating mechanism will be clearly and completely visible to the reader.

The invention consists in the improvements to be more fully described hereinafter, and the novelty of which will be particularly pointed out and distinctly claimed.

I have fully and clearly illustrated a preferred embodiment of the invention in the accompanying drawings, to be taken as a part of this specification, and wherein—

Figure 1:
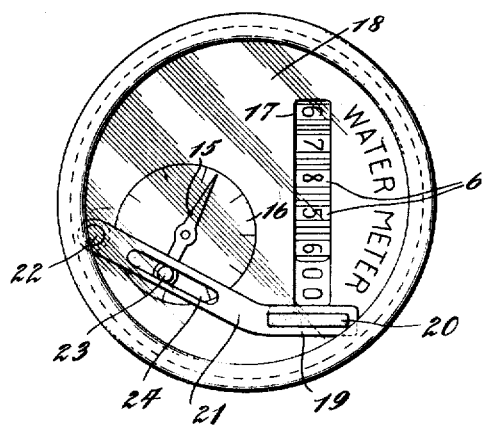
Figure 1 is a plan or face view of a meter dial showing the indicating mechanism, the dial glass, and a cleaning mechanism for cleaning, and maintaining clean, the underside of the dial glass.
Figure 2:
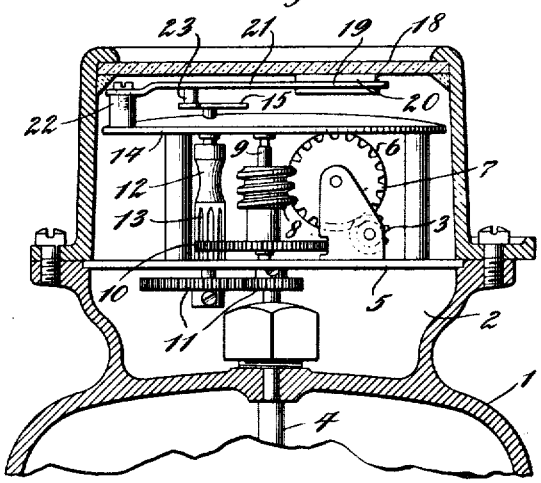
Fig. 2 is a transverse vertical section through so much of a well known form of meter as is sufficient to illustrate my invention shown in connection therewith.

Before proceeding with a detailed description of a preferred embodiment of my invention, I desire to make it understood that the invention is applicable to meters generally, and particularly water meters, without regard to the specific mechanism or type of meter, and is not to be limited to the particular type of meter and registering mechanism illustrated and described hereinafter.

Referring to the drawings by characters of reference, 1 indicates a meter casing containing a chamber 2 for registering mechanism 3 adapted to be driven from a shaft 4 connected to the measuring mechanism (not shown). This registering mechanism is mounted on a plate 5, suitably supported in the chamber 2, and may consist, as shown, of the indicating wheels 6 driven in any suitable manner by gearing 7 with which meshes a worm wheel 8 on a vertical shaft 9. This shaft bears a gear 10 driven by suitable gearing (not shown) from the shaft 4, a portion of the gearing being shown at 11. It is not necessary for the purposes of this invention to describe or illustrate this indicating mechanism or driving means in detail as it is of a well known type and forms no part of my present invention.

12 designates a vertical shaft or spindle carrying a gear 13 from which said shaft is driven by means of the said gear 10. This shaft 12 extends above the dial plate 14, which overlies the registering mechanism, and carries at its upper end a hand 15 coöperating with the annular dial 16 commonly known in the type of meter shown as "the test dial." During the operation of the meter this shaft 12, and the hand 15, are continuously driven at a low speed so that the hand 15 continuously traverses the dial 16. The dial plate 14 is provided with a suitable sight opening 17, through which the number-bearing portions of the indicating wheels 6 are visible.

The upper portion of the casing 1 is closed by a cover glass or dial glass 18 suitably sealed or held in position in a plane parallel to the dial plate and spaced therefrom.

Arranged above the dial, between the same and the dial glass 18, is a wiper member 19 adapted to contact with the underface of the dial glass, and carrying a wiping substance 20, such as felt or other suitable material, which will maintain the glass clean without scratching or injuring the same. This wiper member 19 is arranged to move back and forth across that portion of the dial glass which covers the indicating means 6, which is read to ascertain the state of the meter. In this instance, said wiper member 19 is movable across the sight opening 17 in the dial plate, through which opening the numerals on the indicating wheels of the registering mechanism are visible. This wiper member may take a number of forms within the spirit of my invention, but I prefer to make it in the form of a bar or plate 21, one end of which is pivoted, as at 22, at a suitable point on the dial plate, and is adapted to be engaged by a rotatable part, preferably driven continuously from the meter mechanism whenever the latter operates, whereby the said bar is swung back and forth so that the wiper member reciprocates or oscillates across the dial-glass. For this purpose I preferably drive the bar and wiper member from the hand 15 which coöperates with the test dial 16, a suitable connection between said hand and bar being made by providing the rear end of the said hand with a crank pin or projection 23, slidably engaging a slot 24 formed in and extending longitudinally of the bar 21, carrying the wiper member. While I have shown this bar 21 as preferably being driven or moved from the test hand, I desire it understood that I do not so limit myself, as said member may be driven by other driving means, or through suitable connections from any part of the meter suitable for the purpose. The means described, however, provides an efficient and simple means for driving the wiper member, without the necessity of complicating the meter by the addition of special driving means.

It is thought that the operation of the device will be clearly understood from the above description, from which it will be seen that the wiper member is movable back and forth across the dial over the sight opening 16, which movement is accomplished by virtue of its pivotal connection 22, and the drive afforded by the rotary member consisting of the rotatable test hand 15. By the arrangement shown the wiper member is continuously and repeatedly moved back and forth across the dial glass in contact therewith, so that any accumulation thereon in the form of mist, water of condensation, dew, or dirt, is removed by the wiper while freshly deposited on the glass and before it has had time to accumulate or harden thereon so as to render its removal difficult or uncertain.

What I claim and desire to secure by Letters Patent of the United States is—

1. In a meter, the combination of meter mechanism, a casing inclosing said mechanism and provided with a transparent member through which the indicator thereof is visible, a wiper contacting with the inner surface of said transparent member, and means actuated by the meter mechanism and arranged entirely within the casing for moving the wiper.

2. In a meter, the combination of meter mechanism, a casing inclosing said mechanism and provided with a transparent member through which the indicator thereof is visible, a wiper contacting with the inner surface of said transparent member, and connections between the wiper and meter mechanism for continuously moving the wiper as said mechanism operates, all of said parts being inclosed and protected by the casing.

3. In a meter, the combination of meter mechanism, a dial having a sight opening, a casing inclosing said parts and provided with a glass extending across the sight opening in the dial, a wiper member pivoted on the dial and movable across the sight opening therein in contact with said glass, a dial hand driven by the meter mechanism, and connections between said hand and the wiper for moving the latter, all of said parts being inclosed within said casing.

4. In a meter, the combination of meter mechanism, a casing inclosing said mechanism and provided with a glass through which the indicator thereof is visible, a wiper contacting with the inner surface of said glass, and means for swinging said wiper back and forth, said means consisting of a rotating part driven by the meter mechanism and a connection between said part and the wiper.

5. A meter unit comprising a casing provided with a transparent member through which the meter indicator is visible, a meter mechanism, a wiper mounted within said casing and engaging the inner surface of said transparent member, said wiper being actuated by the meter mechanism and movable back and forth across said transparent member to remove therefrom any obstruction to the light rays.

In testimony whereof I have hereunto signed my name in the presence of two subscribing witnesses.

WILLIAM E. FITZ SIMONS.

Witnesses:
M. E. McNinch,
C. G. Heylmun.

It is hereby certified that in Letters Patent No. 1,354,816, granted October 5, 1920, upon the application of William E. Fitz Simons, of Freeport, New York, for an improvement in "Meters," an error appears in the printed specification requiring correction as follows: Page 2, line 97, claim 5, strike out the word "unit;" and that the said Letters Patent should be read with this correction therein that the same may conform to the record of the case in the Patent Office.

Signed and sealed this 30th day of November, A. D., 1920.

[SEAL.]

L. B. MANN,
*Acting Commissioner of Patents.*

Cl. 235—1.